W. P. B. HAMILTON & H. VOGLESONG.
FLEXIBLE SHAFT COUPLING.
APPLICATION FILED JULY 1, 1915.
1,182,905.
Patented May 16, 1916.
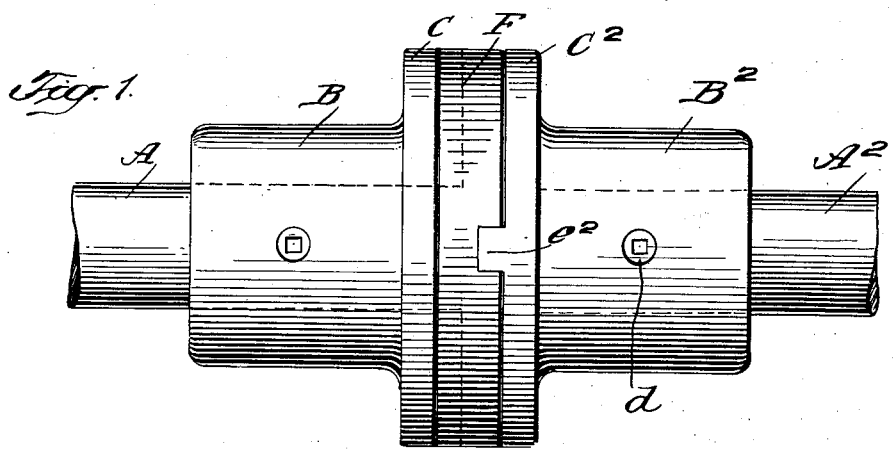
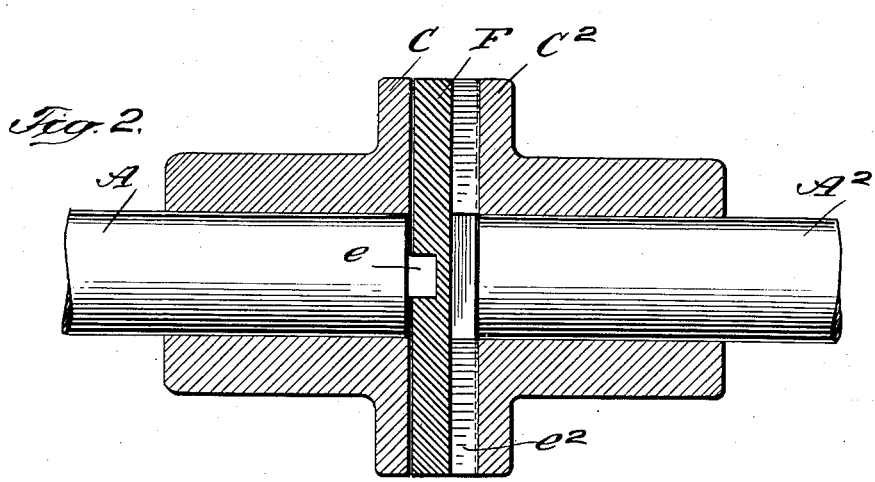
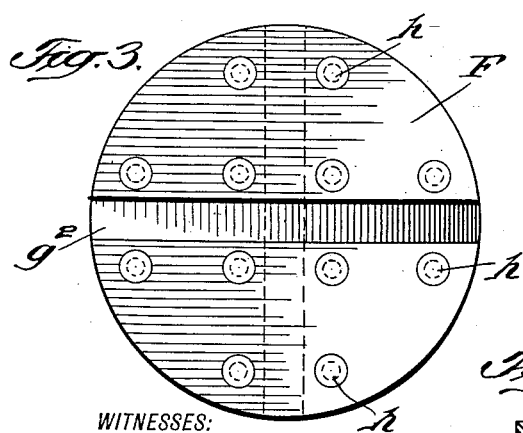
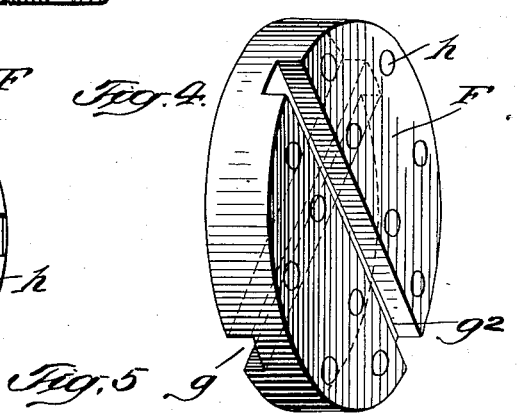
WITNESSES:
INVENTORS
William P. B. Hamilton
Henry Voglesong
BY
John H. Hilliard
ATTORNEY

UNITED STATES PATENT OFFICE.

WILLIAM P. B. HAMILTON AND HENRY VOGLESONG, OF JERSEY CITY, NEW JERSEY.

FLEXIBLE SHAFT-COUPLING.

1,182,905. Specification of Letters Patent. Patented May 16, 1916.

Original application filed December 8, 1914, Serial No. 876,017. Divided and this application filed July 1, 1915. Serial No. 37,439.

*To all whom it may concern:*

Be it known that we, WILLIAM P. B. HAMILTON, residing at No. 54 Magnolia avenue, Jersey City, State of New Jersey, and HENRY VOGLESONG, residing at No. 578 Newark avenue, in said city and State, both citizens of the United States, have invented a new and useful Improvement in Flexible Shaft-Couplings, of which the following is a specification.

One object of our invention is to provide a means for detachably coupling the driving end of one shaft with the driven end of another shaft, and at the same time insulating the one from the other, even though the shafts be running at high speed and the coupling be subjected to a maximum of stress.

This application is a division of our application for patent for flexible shaft couplings, Serial No. 876,017 filed December 8, 1914.

Another object of our invention is to provide a detachable insulating shaft coupling which will be adaptable for high speed or a maximum of stress and which will be in operative connection although the axes of the coupled shafts vary in a slight degree from a position of axial alinement and even though the axis of one shaft intersect the axis of the other at a slight angle near the junction of the shafts.

Another object of our invention is to provide a detachable shaft coupling that will produce a minimum of noise and vibration when in operation, and which will be subject to a minimum of wear on the connecting parts and require little or no lubrication.

In the accompanying drawings, Figure 1 shows a side elevation of our device assembled, in perspective; Fig. 2 is a central horizontal section of the device as shown in Fig. 1; Fig. 3 is a face view of the locking member of our coupling; Fig. 4 is a perspective view of the locking member of our coupling; Fig. 5 is a cross-section view of the locking member of our coupling as shown in Figs. 3 and 4 and showing the method of reinforcing the material of the member.

Referring to the said drawings; on each of the shafts A and $A^2$ is mounted a coupling member composed of collars B and $B^2$ which form the hubs of the disks C and $C^2$. The collars B and $B^2$ are fixed against rotation on the shafts A and $A^2$ by means of key or other convenient means and they may be adjusted longitudinally on the shafts A and $A^2$ by means of binding screws $d$. The face of each of the disks C and $C^2$ is provided with diametrical lugs $e$ and $e^2$.

For the purpose of locking the two coupling members in operative connection, a key disk F which, is of electrically insulating material such as fiber, is provided on either face with diametrical slots or grooves $g$ and $g^2$ of proper width to engage the lugs $e$ and $e^2$ and to slide easily thereon, the said slots or grooves being at right angles to each other. The key disk F may be strengthened by rivets $h$ which will assist the material of the disk in resisting the stress produced when revolution of the shafts takes place. We prefer that, in this construction, the depth of the said slots be somewhat less than the height of the lugs $e$ so that when the parts are assembled in operative connection there will be a slight space between the opposing faces of the key disk and the coupling members with the result that the heads of the rivets may be flush with the surfaces of the key disk or even project to a slight extent above the surfaces of the key disk but yet will not come in contact with the opposing faces of the coupling members.

The foregoing described form of our device is best shown in Fig. 1. The heads of the rivets may, however, be set below the surfaces of the key disk in which event the height of the lugs $e$ may be even with the depth of the groove $g$, or even less and the surfaces of the key disk may be in contact with the opposing faces of the coupling members. It will be seen that in this construction the maximum resisting power of the material which insulates the coupling members from one another is utilized, and that, although the axis of one shaft be out of alinement with the axis of the other and even though the axis of the shafts intersect at a slight angle near the junction of the shafts, the coupling members are still insulated from one another and the coupling is still operative.

It will be seen that even though insulation is not desired or necessary, the device nevertheless possesses the advantage of having its bearing surfaces constructed of metal and fiber working upon each other, with a consequent great power of resistance to wear, lack of necessity for lubrication and a minimum of noise and vibration.

We claim as our invention:

1. In a shaft coupling, two coupling members, each member consisting of a disk provided with a hub, said disk being provided with a diametrical lug, a key disk of fiber strengthened by rivets, each face of said disk being provided with a diametrical groove said grooves being at right angles to each other and of proper width to engage said lugs and of a depth less than the height of said lugs.

2. In a shaft coupling, two coupling members, each member consisting of a disk provided with a hub, said disk being provided with a diametrical lug, a key disk of fiber strengthened by rivets the heads of which are set beneath the surfaces of the faces of said disk, each face of said disk being provided with a diametrical groove, said grooves being at right angles to each other and of a proper width to engage said lugs.

3. In a shaft coupling, two coupling members, each of which is provided with a lug passing through its axis, a key disk of fiber strengthened by rivets each face of said disk being provided with a diametrical groove, said grooves being at right angles to each other and of a proper width to engage said lugs and of a depth less than the height of said lugs.

4. In a shaft coupling, two coupling members, each of which is provided with a lug passing through its axis, a key disk of fiber strengthened by rivets the heads of which are set beneath the surfaces of the faces of the disk, each face of said disk being provided with a diametrical groove, said grooves being at right angles to each other and of a proper width to engage said lugs.

5. In a shaft coupling, two coupling members, each of which is provided with a lug passing through its axis, a key disk of reinforced fiber, each face of said disk being provided with a diametrical groove, said grooves being at right angles to each other and of a proper width to engage said lugs.

WILLIAM P. B. HAMILTON.
HENRY VOGLESONG.

Witnesses:
JEANNETTE M. O'CONNOR,
ALBERT E. THAYER.